US008863816B2

(12) United States Patent
Pyzik et al.

(10) Patent No.: US 8,863,816 B2
(45) Date of Patent: Oct. 21, 2014

(54) METAL-INFILTRATED TITANIUM—SILICON-CARBIDE AND TITANIUM—ALUMINUM-CARBIDE BODIES

(75) Inventors: Aleksander J. Pyzik, Midland, MI (US); Nicholas M. Shinkel, Bay City, MI (US); Robert A. Newman, Midland, MI (US); Clifford S. Todd, Midland, MI (US); Amy Wetzel, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 861 days.

(21) Appl. No.: 12/994,763

(22) PCT Filed: Jun. 3, 2009

(86) PCT No.: PCT/US2009/046062
§ 371 (c)(1),
(2), (4) Date: Dec. 27, 2010

(87) PCT Pub. No.: WO2010/033278
PCT Pub. Date: Mar. 25, 2010

(65) Prior Publication Data
US 2011/0104464 A1    May 5, 2011

Related U.S. Application Data

(60) Provisional application No. 61/059,315, filed on Jun. 6, 2008.

(51) Int. Cl.
| | |
|---|---|
| B22D 23/04 | (2006.01) |
| C22C 1/10 | (2006.01) |
| C04B 41/51 | (2006.01) |
| C04B 35/56 | (2006.01) |
| C04B 35/71 | (2006.01) |
| C04B 41/00 | (2006.01) |
| C04B 41/88 | (2006.01) |
| C22C 29/06 | (2006.01) |

(52) U.S. Cl.
CPC ........... *C04B 35/5615* (2013.01); *C22C 1/1036* (2013.01); *C04B 35/5618* (2013.01); *C04B 35/71* (2013.01); *C04B 41/009* (2013.01); *C04B 41/5127* (2013.01); *C04B 41/5155* (2013.01); *C04B 41/88* (2013.01); *C22C 29/06* (2013.01); *C04B 2235/3843* (2013.01); *C04B 2235/3891* (2013.01); *C04B 2235/402* (2013.01); *C04B 2235/405* (2013.01); *C04B 2235/407* (2013.01); *C04B 2235/608* (2013.01); *C04B 2235/616* (2013.01); *C04B 2235/6581* (2013.01); *C04B 2235/6582* (2013.01); *C04B 2235/75* (2013.01); *C04B 2235/786* (2013.01); *C04B 2235/788* (2013.01); *C04B 2235/80* (2013.01); *C04B 2235/85* (2013.01); *C04B 2235/96* (2013.01)
USPC ............................................... 164/97; 164/98

(58) Field of Classification Search
CPC ....... B22D 23/04; C22C 1/1036; C04B 41/51
USPC ...................................... 428/610; 164/97–98
See application file for complete search history.

(56) References Cited

U.S. PATENT DOCUMENTS

| | | | |
|---|---|---|---|
| 7,942,638 B2 * | 5/2011 | Eichmann et al. | ........ 416/229 A |
| 2010/0055492 A1 * | 3/2010 | Barsoum et al. | ............. 428/613 |

OTHER PUBLICATIONS

Jordan et al., "High pressure behavior of titanium—silicon carbide (Ti3SiC2)", J. Applied Physics, Jun. 15, 2003, vol. 93 No. 12, pp. 9639-9643.*

(Continued)

*Primary Examiner* — Gwendolyn Blackwell
*Assistant Examiner* — Lucas Wang

(57) ABSTRACT

Densified composites of a metal such as copper or aluminum with a titanium-silicon-carbide or titanium-aluminum-carbide ceramic material are prepared by forming the ceramic material into a body, and infiltrating the body with the molten metal. The metal is able to rapidly penetrate into void spaces, between grain boundaries and even into the crystal structure of the ceramic grains to form a composite. The starting ceramic material may be previously densified, in which case various types of gradient structures can be produced easily. The process can be operated at low pressures, and so the hot pressing methods that normally must be used to densify these ceramic materials can be avoided.

12 Claims, 4 Drawing Sheets

(56) References Cited

OTHER PUBLICATIONS

Zhou et al., "Synthesis and mechanical properties of Ti3AlC2 by spark plasma sintering", J. Mats. Sci., 2003, vol. 38, pp. 3111-3115.*

Peng et al., "Fabrication and properties of Ti3AlC2 particulates reinforced copper composites", Scripta Materiala 56, pp. 729-732 (2007).

Gu et al., "Reactions between Al and Ti3SiC2 in temperature range of 600-650C", Scripta Materiala 49, pp. 1075-1080 (2003).

Guo et al., "Surface strengthening of Ti3SiC2 through magnetron sputtering Cu and subsequent annealing" J. European Ceramic Society 28, pp. 2099-2107 (2008).

Yin et al. Microstructure and mechanical strength of transient liquid phase bonded Ti3SiC2 joints using Al interlayer, J. European Ceramic Society 27, pp. 3539-3544 (2007).

Zhang et al. "Structure stability of Ti3AlC2 in Cu and microstructure evolution of Cu—TiAlC2 composites", Acta Materialia 55, pp. 4381-4390 (2007).

Zhang et al., "Cu/Ti3SiC2 composite: a new electrofriction material", Materials Research Innovations 3, pp. 80-84 (1999).

* cited by examiner

METAL-INFILTRATED TITANIUM—SILICON-CARBIDE AND TITANIUM—ALUMINUM-CARBIDE BODIES

This application claims priority from U.S. Provisional Patent Application No. 61/059,315, filed 6 Jun. 2008.

This invention relates to composites of metals with titanium-silicon-carbides or titanium-aluminum-carbides.

Certain titanium-silicon-carbide (TSC) and titanium-aluminum-carbide (TAC) materials form part of a class of ceramics that are sometimes referred to as "MAX" materials. These ceramics have a laminar molecular structure in which strongly bonded plates made up of titanium and carbon atoms are connected by weaker bonds to intermediate silicon or aluminum layers. This laminar structure is believed to account for some very interesting properties of these materials. These materials are resistant to oxidation, like most ceramics, but are easily machinable. They have excellent toughness compared to most ceramic materials and at the same time have a high modulus. These materials are self-lubricating in much the same way as graphite is self-lubricating.

One major drawback to using these materials is that they are difficult to densify to form parts. Hot pressing methods followed by a prolonged heat treatment are needed to produce dense parts. These processing requirements lead to high cost, and the formation of large grains in the densified part. Furthermore, the hot pressing method can only be used to make rather simple shapes. More complex shaped parts must be machined after the densification step.

It has also been proposed to form composites of metals with TSC or TAC materials. For example, it has been attempted to form composites of copper with a titanium-silicon-carbide from a mixture of powders. However, it is difficult to densify the materials, even using hot pressing methods, unless the ceramic phase loading is quite low. Another shortcoming of this approach is that the ceramic phase is not as finely dispersed in the metal phase as is desired. The extent to which the ceramic becomes dispersed in the metal phase is limited by the particle size of the starting powder. Even if a very fine powder is used as a starting material, it is difficult in practice to prevent the ceramic particles from agglomerating. As a result, the ceramic phase is somewhat coarsely distributed throughout the composite, even when very fine starting powders are used. The parts made in this manner therefore do not have properties that are as good as expected.

Attempts to form a composite by coating copper onto TSC particles and then densifying the coated particles have not resulted in a significant improvement. Hot pressing methods are still required in order to density the material. Similarly, $Ti_3AlC_2$ and copper powders have been mixed and densified using hot pressing methods. In this case, a reaction between the ceramic and metal phases has been observed. The densified composite contains mainly Cu(Al) and cubic $TiC_x$ as the main phases. See Zhang et al., "Structure Stability of $Ti_3AlC_2$ in Cu and microstructure evolution of Cu—$Ti_3AlC_2$ composites", *Acta Materialia*, in press (2007).

Therefore, it would be desirable to provide composites of a metal with a TSC or a TAC, which can be densified easily, can contain a high loading of the ceramic phase, and which have good mechanical and electrical properties. Preferably, the composite has a ceramic phase that is intimately dispersed within the metal phase.

This invention is in one aspect a method for forming a composite of a metal and a titanium-silicon-carbide or titanium-aluminum-carbide starting ceramic material, comprising forming a body of the starting ceramic material and contacting the body with the metal at a temperature above the melting temperature of the metal but below the degradation temperature of the ceramic material, for a sufficient time such that at least a portion of the metal infiltrates into the body to form a composite, and then cooling the resulting composite to below the melting temperature of the metal.

The invention offers several advantages and in many cases produces a unique composite material. First, a fully dense composite is formed easily and rapidly. The process can be conducted at atmospheric pressure or at sub-atmospheric pressures. Therefore, hot pressing techniques are not needed to form dense bodies. The ability to use low pressure densification methods allows one in some cases to directly produce composite bodies that have complex shapes. This can reduce or even eliminate the need for subsequent processing. In addition, there is no need for any post-densification heat-treatment, as is normally required to fully densify titanium-silicon-carbide and titanium-aluminum-carbide parts. Composites made by the process can have a wide range of ceramic contents.

This invention is also a densified composite having a metal phase and a titanium-silicon-carbide or titanium-aluminum-carbide ceramic phase, wherein the metal phase constitutes from about 10 to 90% of the volume of the composite.

Composites of the invention have many useful properties, which will of course depend in any particular case on the relative proportions of the metal and ceramic phases and the distribution of the metal and ceramic phases within the composite. The composites are highly thermally and electrically conductive. Compared to densified 100% TSC and TAC materials, the composites of the invention have greater toughness and greater tensile strength, while still retaining an acceptable Young's modulus. When machining is necessary, the composites can be machined using tooling such as tungsten carbide tooling, instead of more expensive diamond tooling.

In addition, the process of the invention permits a measure of control over how the metal is distributed within the composite. At one end of the spectrum, the process can be used to make composites that have, on a macroscopic scale, a highly uniform distribution of the metal throughout the composite body. The process can also be used to make gradient structures, in which the macroscopic concentration of metal changes along one or more dimensions of a composite body. This results in a composite body in which certain regions have a higher metal content, on a macroscopic scale, than do other regions. In certain cases, one or more regions of the composite body can be made up of essentially 100% metal. The metal concentration then decreases incrementally or step-wise with increasing distance from the metal region or regions, until the metal concentration is reduced in another region or regions of the composite body to some desired lower level, which can be as little as zero. A gradient structure such as this can provide a malleable and/or weldable metallic surface through which the composite can be attached to another material (such as, for example, by welding it to another metal body), and another surface that is richer in the ceramic phase and can provide, for example a wear or contact surface that takes advantage of the self-lubricating properties of the titanium-silicon-carbide or titanium-aluminum-carbide ceramic.

Another surprising feature of the invention is that, during the infiltration process, the metal can penetrate around and between grain boundaries of the ceramic phase to form metal domains at the interface of adjacent ceramic grains. This occurs even if the ceramic has been previously densified, which is especially surprising. In some cases, the metal has even been seen to intercalate between laminae of the TSC and TAC material to form an exfoliated structure. The process of the invention therefore can produce nanocomposites, without needing to use nano-powders as starting materials. Avoiding nano-powder starting materials has benefits in cost, as nano-powders are more expensive starting materials, and in avoiding potential health issues that may be seen with handling nano-powders.

Figure 1:
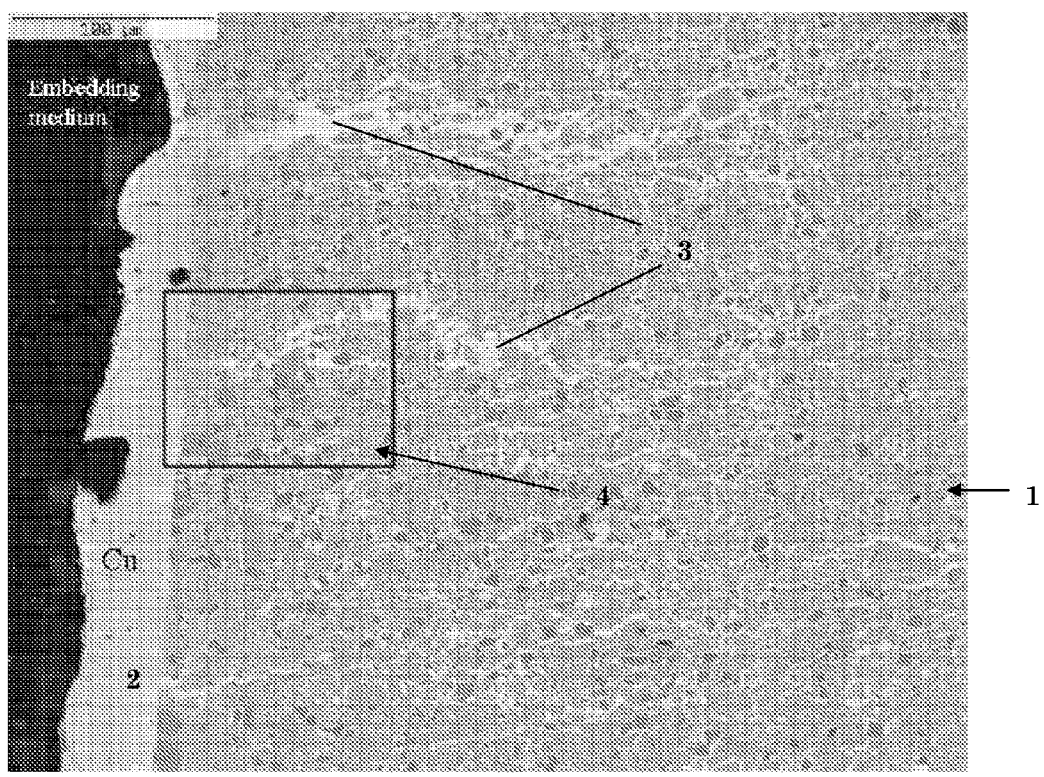
FIG. 1 is a micrograph of a composite of the invention, at a magnification of 250×.

The titanium-silicon-carbide (TSC) used herein as a starting material is a ceramic material having a laminar molecular structure. The empirical formula for TSC is generally given as $Ti_3SiC_2$ or sometimes as $Ti_5Si_2C_4$, but some departures from these formulae often exist in actual specimens or even within a single specimen. The atomic ratio of Ti to Si may vary from about 2.3:1 to 3.3:1, and that of C to Si may vary from about 1.8:1 to about 2.3:1. In some TSC products, the empirical formula may be approximately $Ti_4SiC_3$ or $Ti_5Si_2C_4$. The TSC can be formed in the reaction of titanium carbide with titanium silicide. Another source of titanium can be titanium metal, titanium fluoride or titanium dioxide, which can react with a source of silicon (such as silicon metal or silicon dioxide) and a source of carbon (typically carbon or silicon carbide) to form a TSC material. The titanium-silicon-carbide may or may not be a pure material. In some cases, the TSC may contain phases of other materials, notably a titanium-carbon phase and/or a titanium-silicon phase, which can be present as a result of an incomplete reaction.

The titanium-aluminum-carbide (TAC) used herein also is a ceramic material having a laminar structure. The empirical formula in this case is generally given as $Ti_2AlC$, but, as before, some departures from this formula often exist in actual specimens or within a single specimen. The atomic ratio of Ti to Si may vary from about 1.8:1 to 2.5:1, and that of C to Si may vary from about 0.8:1 to about 1.3:1. The TAC can be formed in the reaction of a source of titanium (such as titanium metal or titanium oxide), a source of aluminum (such as aluminum metal, aluminum fluoride or aluminum oxide) and a source of carbon. The TAC may contain phases of other materials, including phases of unreacted starting materials from its synthesis.

The metal is any metal which, when melted, wets the ceramic phase at some temperature below the decomposition temperature of the ceramic phase. The decomposition temperature is that temperature at which the TSC or TAC material thermally decomposes when heated by itself in an inert atmosphere. For TSC materials, that temperature is approximately 1500° C. in vacuum and 1800° C. or higher in an argon atmosphere. For TAC materials, that temperature is approximately 1500 to 1800° C.

Preferred metals include copper and copper alloys that contain at least 75 weight percent copper. Among the preferred copper and copper alloys are copper wrought alloys and cast alloys, high copper wrought alloys and cast alloys, copper-zinc (yellow brass) alloys, copper-zinc-lead (leaded brass) alloys, copper-zinc-tin alloys (tin brass), copper-tin-phosphorus alloys (phosphor bronze), copper-tin-lead-phosphorus alloys (leaded phosphor bronze), copper-phosphorus alloys, copper-silver-phosphorus alloys, copper-silver-zinc alloys, copper-aluminum alloys (aluminum bronze), copper-silicon wrought alloys and cast alloys (silicon bronze and brass), copper-nickel alloys, copper-tin-zinc cast alloys, copper-tine-zinc-lead cast alloys, copper-tin-lead alloys (leaded tin bronze), copper-tin-nickel alloys (nickel tin bronze), copper-aluminum-iron alloys, copper-aluminum-iron-nickel alloys, and the like, in each case preferably containing at least 75% by weight copper and more preferably at least 80% by weight copper. Among these, copper wrought and cast alloys containing at least 99% by weight copper, high copper alloys containing at least 97% by weight copper, and aluminum bronzes containing up to about 15% aluminum, up to 6% nickel, up to 5% iron and at least 80% by weight copper are preferred.

Other preferred metals include aluminum and aluminum alloys, including unalloyed aluminum products such as those designated as P0202A-P2585B, inclusive, in the Aluminum Association "Gold Sheets", March 2007; wrought aluminum and wrought aluminum alloys such as those designated as 1050-8211, inclusive, in the Aluminum Association "Teal Sheets", April 2006, and aluminum hardeners such as those designated as H2206-H2975 in the Aluminum Association "Gray Sheets", July 2007. Aluminum alloys preferably contain at least 75%, more preferably at least 90% aluminum by weight. Aluminum and aluminum alloys are especially preferred in forming compositions with a TAC material.

The composite is produced by forming a starting body of the TSC or TAC material and contacting the body with the metal at a processing temperature as described below. The starting body is simply a mass of the starting TSC or TAC material, in some convenient shape and size, which is to be infiltrated with the metal. The shape and dimensions are not important to the process, except to the extent that those factors may affect the processing time and amount of metal that are required. The starting body may assume the approximate shape and dimensions that are required for the end-use application in which the composite will be used. Alternately, the starting body may be formed in some other arbitrary or convenient shape and size, in which case the composite may be subjected to further processing in order to produce a part adapted for a particular end-use application.

The starting body may be a compressed powdery or particulate TSC or TAC material, or a TSC or TAC material that has been previously densified. A powdery TSC material used to make up the starting body can be, for example, in the form of a powder of any particle size ranging from as little as about 10 nanometers up to 100 microns or more. The TSC or TAC material in the starting body may take the form of larger particles having a size of from 100 microns to 1 centimeter or more. Similarly, the TSC or TAC in the starting body may be in the form of a fully or partially densified larger body, which may be as large as the starting body itself. Starting bodies made from powdery or particulate TSC or TAC starting materials are generally porous. Usually, compressed powders or particulates will have a density of from 40 to 70% of the theoretical density of the material. Starting bodies made from densified TSC or TAC materials are generally non-porous or at most only slightly porous. As discussed more below, in some cases one physical form of the TSC or TAC in the starting body may be preferred over another in order to give rise to specific composite structures.

In addition, the starting material may contain the TSC or TAC material mixed with one or more other materials. The other material may be another ceramic material, including another TSC or TAC material, and may constitute up to 50% by volume of the ceramic starting materials. The other ceramic material may include one or more of the starting materials that were used to make the TSC or TAC material. For example, a TSC material may contain some titanium-carbon and/or titanium-silicon phases that are present due to an incomplete reaction. The other ceramic material may be another one of the so-called "MAX" ceramic materials, which have the approximate empirical formula $M_{n+1}AX_n$, where M is Sc, Ti, V, Cr, Zn, Nb, Mo, Hf or Ta, A is Al, Ga, Si, In or Sn and X is C or N. Other useful starting ceramic materials that can be mixed with the TSC or TAC starting material include oxides (such as $Al_2O_3$, MgO, $ZrO_2$, $TiO_2$), mullite ($Al_6Si_2O_{13}$), nitrides (such as $Si_3N_4$, AlN), carbides (such as SiC, $B_4C$, WC, TiC) and borides (such as $SiB_4$, $SiB_6$). Among these, SiC, $B_4C$, WC, $Al_2O_3$, MgO, $ZrO_2$, AlN, $SiB_4$, $SiB_6$ or a mixture of two or more thereof are preferred. The other material may also be a metal, which may be the same as or different from the metal that is used to infiltrate the starting body. Another material that can be present is an organic or other binder, or a sintering aid. The other material preferably constitutes no more than 50%, especially no more than 25% by weight of the starting body.

To form the composite, the metal is placed in contact with one or more external surfaces of the starting body. This can be done before or after the starting body is brought to the processing temperature. The metal can be in any convenient physical form, such as a solid (such as a film, sheet or plate), a particulate, or even as a liquid, at the time it is contacted with the starting body.

The processing temperature is above the melting temperature of the metal but below the degradation temperature of the ceramic material.

The temperature to which the starting materials are heated has been found to be important to forming the desired composite, especially when the starting TSC or TAC material is not densified. It has been found that heating the materials to a temperature high enough to simply melt the metal often produces a lower quality composite if the starting TSC or TAC material is not densified. The composite may not become densified and often does not fully develop its physical, electrical and/or thermal properties. However, if the materials are heated to a somewhat higher temperature, the composite readily densifies and the metal becomes highly dispersed within the ceramic phase. This leads to a significant improvement in properties. It is believed that at some temperature higher than the melting temperature of the metal, the metal becomes more capable of wetting the grains of the TSC or TAC starting material, particularly when it is not densified. This wetting allows the metal to penetrate between and even into the grains, which in turn allows for rapid densification of the composite and better dispersion of the metal into the ceramic phase. Although the phenomenon is not fully understood, it may be related to the dissolution of grain boundaries by the molten metal at the higher temperatures, and/or to some reaction between the metal and the surface of the ceramic phase which improves wetting and thereby allows the molten metal to penetrate between grain boundaries and even into the grains.

In the case of copper and copper alloys, melting temperatures are often in the range of from about 1050 to 1150° C. However in this invention, the temperature used to form the composite is preferably at least 1250° C. and is more preferably at least about 1300° C. when copper or copper alloys containing at least 75% by weight copper are used and the starting TSC or TAC material is not densified. At these higher temperatures, the copper and copper alloys readily penetrate around and even into grains of the ceramic phase. It has been found that somewhat lower processing temperatures, such as from 1125 to 1250° C., can be used to make good quality composites, if a small amount of the copy or copper alloy is dispersed in the starting body in the form of a powder or fine particulate, or if some or all of the TSC or TAC particles in the starting body are coated with a metal. About 1 to 20% by weight of metal in the starting body is sufficient for this purpose. The metal is preferably copper or a copper alloy containing at least 75% by weight copper.

Similarly, although many aluminum and aluminum alloys have melting temperatures in the range of 650 to 700° C., it has been found that the composite should be formed by heating to a significantly higher temperature. The processing temperature preferably is at least 1100° C. and is preferably at least about 1150° C., when aluminum or an aluminum alloy containing at least 75% aluminum is used as the metal and all the starting TSC or TAC material is not densified. Again, lower temperatures may be useful if some metal is dispersed in the starting body in the form of a powder or fine particles or as a coating on the TSC or TAC particles. As before, 1 to 20% by weight metal in the starting body is sufficient for this purpose.

The upper end of the temperature range for the heating step is determined by the thermal stability of the TSC or TAC material. The temperature should not be so high that the TSC or TAC material decomposes, coarsens or oxidizes. A suitable upper temperature limit for TSC and TAC materials is about 1500° C., preferably up to about 1400° C., and in case of TAC, more preferably up to 1350° C.

If the starting TSC or TAC material is densified, a temperature range from above the melting temperature of the metal to below the temperature at which the TSC or TAC materials decomposes, coarsens or oxidizes is suitable. When the metal is a copper or a copper alloy containing at least 75% copper, this temperature is preferably from 1050 to 1800° C., more preferably from 1150 to 1500° C. and even more preferably from 1150 to 1400° C. When the metal is aluminum or an aluminum alloy containing at least 75% aluminum, this temperature is preferably from 650 to 1800° C., more preferably from 1000 to 1400° C. and even more preferably from 1050 to 1200° C.

The heating step can be performed under a subatmospheric pressures and/or under an inert atmosphere. An inert atmosphere is one which does not react significantly with the starting materials or composite under the conditions of the heating step. Hydrogen, argon and helium are examples of inert atmospheres. Conducting the heating step under a vacuum can have the advantage of preventing entrained gasses from forming a mechanical barrier to the infiltration of the metal between grains or particles of the ceramic phase. If a subatmospheric pressure is used, the pressure is preferably less than 1 Torr, and more preferably less than $10^{-3}$ Torr. The heating step can be done at atmospheric pressure or superatmospheric pressure, although high pressure conditions such as above 2 atmospheres pressure are usually not necessary in order to obtain a densified product The molten metal generally infiltrates rapidly into the starting TSC or TAC body. Therefore, the composite generally forms rapidly once the starting materials are heated to the required temperature, although the time required once that temperature is attained may in some cases depend on the physical dimensions of the part and how much metal is to be infiltrated. Typically, the composite forms in from about 5 minutes to about one hour once the processing temperatures are attained.

After the composite has formed, it is cooled to a temperature below the melting temperature of the metal. The manner in which the composite is cooled is not important. The composite can then undergo various further operations as may be necessary or desired, such as machining or other fabrication steps. If the TSC or TAC material is not fully permeated with metal, and for that reason is not densified, the composite can undergo a hot pressing step or a heat-treatment step to completely densify the part. A densified composite can be machined into any desired shape and size, or otherwise treated as needed or desired for a particular application.

In the process of the invention, the starting bodies can be categorized into two broad types. In the first type, the starting body is not previously densified, and so is made up of a particulate or powdered TSC or TAC material. In the second type, the starting body is already densified. The use of one type or another can affect the types of composites that can be made, as well as their properties.

The first type of starting body usually contains the TSC or TAC material in the form of a particulate or powder. When a powdery or particulate starting material is used, it can be introduced into a suitable mold or container, the interior surfaces of which will define the shape of the starting body and the resulting composite. It is also possible to form a self-supporting "green body" having the desired shape and approximate dimensions of the final composite. Such a green body will normally contain one or more organic binders, which serve to bind the starting particles together and allow easier handling.

When the first type of starting body is used in this invention, the metal melts and at the processing temperatures infiltrates between particles of the TSC or TAC material to form a composite. To the extent that enough metal is provided to fill all voids and sufficient time is provided at the processing temperature to allow the metal to infiltrate all of the void spaces, the resulting composite will be essentially densified. In that case, the composite will have a highly uniform distribution of the metal, at a macroscopic scale. Typically, the amount of metal that is needed to form this highly uniform distribution is a volume of metal equal to or greater than the approximate void volume of the starting body. It has been found that in most cases, very good uniformity in the composition of the composite can be achieved when the metal constitutes about 20% or more by volume of the composite, provided sufficient processing time is provided to permit the metal to infiltrate between the voids of the starting body. The resulting composite in this case typically contains from 20 to 90% metal by volume, preferably from 20 to 75% metal by volume and most preferably 25 to 50% metal by volume.

For purposes of this invention, a macroscopic scale is at least an order of magnitude larger than the typical size of the domains of individual materials in the composite. Typical domain sizes are usually from 0.5 to 10 microns. Any area or volume having dimensions of at least 0.5 mm on a side is considered to be macroscopic for purposes of this invention. It will of course be recognized that at a small enough scale, the composition of the composite can vary greatly.

The metal can also penetrate between grain boundaries in the TSC and TAC starting materials during the heat processing step. As a result, to the extent that enough of the metal is available and there is sufficient processing time, individual grains of the TSC and TAC starting materials become encapsulated by the metal phase, to form a composite at the scale of the grain size of the ceramic phase(s), which is typically in the order of from about 0.5 to 10 microns.

Figure 4:
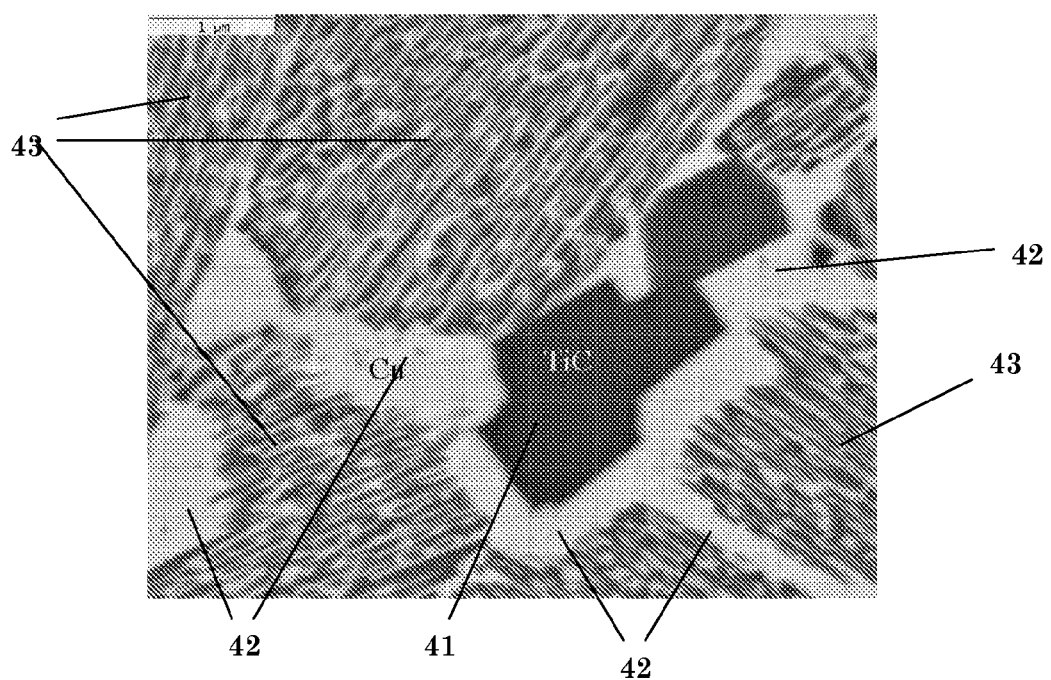
FIG. 4 is a micrograph of a composite of the invention, depicting the region identified in FIG. 2 by reference numeral 21 at a magnification of 20,000×.

Furthermore, if given enough time at the processing temperature, the metal can also penetrate into the TSC or TAC grains themselves, and at least in some cases may react with the TSC or TAC. The penetration of the metal into the TSC or TAC grains, possibly in combination with some reaction between the metal and the TSC or TAC, can result in an exfoliation of some or all of the TSC or TAC. The resulting exfoliated structure has individual layers (or clusters of individual layers) that form an alternating plate structure, where each of the alternating plates has a thickness of from about 3 to 100 nanometers. This is similar to the effect is shown in FIG. 4, which shows microscopic features of a composite made using a densified starting body.

Thus, for example, copper metal can exfoliate TSC grains in this manner to form a nanocomposite, in which each phase has a smallest dimension in the range of 3 to 100 nanometers. Copper is believed to react with TSC grains to form exfoliated plates of a mainly titanium-silicon-copper-carbon phase. The titanium-silicon-copper-carbon plates may contain these four elements in a ratio of about 3-4.5 atoms each of titanium and carbon per silicon atom, and about 0.75 to 1.25 copper atoms per silicon atom. In addition, the exfoliated titanium-silicon-copper-carbon plates appear to be partially if not entirely separated by copper, provided that enough of the copper is provided and sufficient reaction time is allowed. In such cases, titanium-silicon-copper-carbon plates and the copper domains separating those plates each typically have smallest dimensions (thicknessees) on the order of from 3 to 100 nanometers.

The extent to which the metal penetrates grain boundaries and even into TSC or TAC grains depends in part on the amount of metal that is present and the amount of time that the starting materials are exposed to the process temperatures. Longer processing times favor greater penetration between grain boundaries and exfoliation of the TSC or TAC grains, as does increasing the amount of metal.

It is generally preferred, when the starting body is a powder or particulate TSC or TAC material, to provide enough metal and enough processing time for the metal to become distributed throughout the entire body, in which case the composite will be essentially densified. For purposes of this invention, a composite is said to be densified if the density of the composite is at least 96%, preferably at least 98% of theoretical. Theoretical density is determined in known manner from the weight fractions and densities of the starting materials.

Areas which are not permeated by the metal will not become densified. In such a case, further densification methods may be needed to produce a fully dense composite. Therefore, the first type of starting body is particularly useful for producing a densified composite that is of somewhat uniform composition, at a macroscopic level.

If the second type of starting body is used, i.e., a densified TSC or TAC material, there are essentially no voids or pores present through which the metal can permeate. Therefore, the metal must infiltrate the starting body by penetrating between grain boundaries to infiltrate between the TSC or TAC grains. The metal can also infiltrate into the TSC or TAC grains to form an exfoliated structure, as illustrated in FIG. 4. These processes may operate on a longer timescale than the infiltration of the metal through voids in a particulate starting ceramic material. The metal therefore may penetrate through the second type of starting body more slowly than it can penetrate through the pores and voids of a particulate or powdered starting body. Initially, the metal permeates only through regions of the starting body that are close to the source of the metal. With additional time at the processing temperature, the metal permeates through more of the volume of the starting body.

The penetration rates in this case are often slow enough that gradient structures can be produced by manipulating the length of time in which the materials are at the processing temperature. If the heat processing step is terminated before the metal has permeated throughout the entire body, the resulting composite will have a gradient structure, in which some regions will have a higher macroscopic metal content than other regions. The same effect can be achieved by using less metal than is required to infiltrate through the entire starting body. In either case, regions of the starting body that are close to the metal source will tend to be relatively rich in the metal, and those farther from the metal source will be relatively rich in the ceramic phase.

It is possible to form macroscopically uniform composites using a densified TSC or TAC body, but due to slower production rates, it may be preferable to make macroscopically uniform composites using a powdered or particulate TSC or TAC starting material. Because the starting body is already densified, a composite made using a densified TSC or TAC starting body also will be densified, even if the metal does not infiltrate through the entire body.

When a densified starting TSC or TAC body is used to form a composite, the resulting composite may contain from 1 to 50% metal by weight, ignoring for the purposes of this calculation any metal layer that is formed on a composite surface as a result of incomplete infiltration of the metal that is applied during the heat processing step. The metal content may not be macroscopically uniform throughout the composite.

By using a densified starting TSC or TAC body, a wide variety of bodies having gradient structures can be produced according to the invention. In some embodiments, the body has a high metal concentration on one side, and a lower metal concentration (which may be zero) on an opposing side. This structure can be produced by providing metal to only one side of a densified TSC or TAC. During the heating step, the metal will permeate through all or part of the densified TSC or TAC, and, by controlling the amount of metal and/or the heating time, the metal can be made to permeate only partially through the starting body, to create the gradient structure.

The process can be performed such that the resulting composite contains one or more regions that are very rich in the metal, even up to 100% metal, again through the choice of the amount of metal that is contacted with the TSC or TAC, and the amount of time at the processing temperature. Gradient structures having a metallic surface are very useful in applications in which the composite needs to be fastened to other metals, because welding and other metal fabrication techniques can be applied to the metal surface. The metal surface can also function as an electrical contact through which the composite is connected to various types of electrical or electronic circuitry.

It will be appreciated that a large variety of gradient structures can be produced using a densified TSC or TAC starting material, through the choice of where the metal is put into contact with it, and how the heat-processing step is conducted.

One type of gradient structure that is of interest has a metal surface, and an opposing surface that is 100% densified TSC or TAC material or a composite of the metal and the TSC or TAC material. The metal surface can be as thin as about 10 microns, but preferably is at least one millimeter thick, and can be up to any greater thickness that is desired. The macroscopic concentration of the metal in the composite can decrease gradually throughout the thickness of the part, from the metal side to the opposing side. Alternatively, there may be one or more sharp transitions in the macroscopic concentration of the metal. Often, the regions closest to the metal surface are relatively rich in the metal, and those regions farther away from the metal surface are relatively poor in the metal, on a macroscopic scale. Some gradient structures of this type have essentially no metal at or near the opposing side. Gradient structures of this type can be made by applying a relatively large mass of metal to one side of the starting body, such that the starting body cannot absorb all of the metal in the allotted processing time. Alternatively, the processing time is shortened so that the metal does not have time to fully infiltrate the starting body. A 100% TSC or TAC surface can function as a self-lubricating wear surface in some applications.

Another type of gradient structure has a periphery that is macroscopically relatively rich in the metal phase, and an interior or core that is macroscopically relatively poor in the metal phase. The periphery of the part may have a metal surface, which can be of any thickness as described before. Central regions of the gradient structure may have little or even no metal. These structures can be prepared in a manner analogous to that described before, by contacting the periphery of the starting body with the metal source and controlling the processing time and/or the amount of metal so that the gradient structure is formed. As before, the macroscopic metal concentration in this body can decrease gradually from the periphery of the part to the interior, or more or less abruptly in one or more transitions. Also, as before, the metal surface can function, for example, as a weldable surface for attachment to other metals, or as an electrical contact.

As already mentioned, the metal can infiltrate within the individual TSC or TAC grains to form exfoliated TSC or TAC grains that have a layered structure. This can occur when either a densified or non-densified starting ceramic material is used in the process. The layered structure contains alternating plate-like phases, in which each phase has a smallest dimension (thickness) in the range of 3 to 100 nanometers. This exfoliation can be visualized using transmission electron microscopy methods at a magnification sufficient to visualize features at the 3 nm or smaller size scale.

This exfoliation process may operate on a longer timescale than either the penetration through voids and pores or the penetration between grain boundaries that have been described before. Therefore, the presence of this exfoliated structure may depend somewhat on the length of time to which the starting materials are exposed to the processing temperatures. In addition, the extent of exfoliation may not be macroscopically consistent throughout the composite. Regions of the composite that are close to the original metal source or sources may exhibit greater macroscopic concentrations of the exfoliated material, because those regions will have been exposed to the metal for a longer time during the heat processing step than other regions. Preferred composites have a measurable amount of this exfoliation. More preferred composites contain at least 5% by weight of the exfoliated material. Even more preferred composites contain at least 10% by weight of the exfoliated material, and still more preferred composites contain at least 25% by weight of the exfoliated material. The exfoliated material may constitute up to 75% or more of the weight of the composite. As mentioned before, this exfoliated material in certain embodiments is believed to include alternating layers of copper and a titanium-silicon-carbide-copper material.

The composite of the invention is useful for making diesel engine parts, as heat management devices for electronic devices such as automotive electronics and computers, as brushes for electric motors, electrodes or locomotive pantographs, as a slip ring assembly for brushless wound-rotor electric machines, as a turbo impeller for diesel engine, bearings, turbine blades, corrosion-resistant coatings, and for other applications.

The following examples are provided to illustrate the invention but are not intended to limit the scope thereof. All parts and percentages are by weight unless otherwise indicated. Unless stated otherwise, all molecular weights expressed herein are weight average molecular weight.

EXAMPLE 1

A densified TSC material is analyzed by scanning electron microscopy (SEM) and electron probe microanalysis (EPMA) to evaluate its microstructure. SEM is performed by mounting the samples in Buehler Epomet Molding Compound, then grinding and polishing them using standard metallographic techniques. High resolution imaging is performed using a JEOL 6320 field emission scanning electron microscope operating at 10 keV, a current setting of 3, and a working distance of 8 mm.

EPMA is conducted using a Cameca SX50 electron microprobe (serial #SX401) running a SAMx operating system. All elements are measured with wavelength spectrometers: C with a PC2 crystal, Si with TAP, Ti K$\alpha$ with PET and Cu K$\alpha$ with LiF. Quantitative microanalyses are acquired at 15 keV, 10 nA, for 15-20 seconds on the peak, 5 seconds on each of two background positions. PAP correction factors are applied. Calibration standards for C, Si, Ti and Cu are graphite, silicon, titanium and copper, respectively. Multivariate Image Analysis (MIA) is used to perform Principal Component Analysis on element maps of C, Si, Ti and Cu, using software from PLS Toolbox/MIA Toolbox (version 3.5.4/1.0; Eigenvector Research, Inc; Wenatchee, Wash.) in MATLAB™ (version 7.1—R14SP3; Mathworks, Natick, Mass.).

This analysis shows that the densified TSC material predominately consists of grains in the size range of 1 to 10 microns, which have the approximate composition $Ti_5Si_2C_4$. About 25 volume-% of the material is made up of 1-10 micron grains having the approximate composition TiC. A small volume of the material, having a grain size of up to about 3 microns, has the approximate composition $TiSi_2$. This densified TSC material appears to be the product of an incomplete reaction of TiC and $TiSi_2$ at a 4:1 molar ratio. The densified TSC material has a flexural strength of 350 MPa, a fracture toughness of 6.8 MPa/m$^2$ and a Young's modulus of 320 GPa.

A 12 mm×12 mm×8 mm sample of the densified TSC material is placed in a vacuum furnace. Copper foil (10 g) is laid on top of the TSC material. The furnace is evacuated to a pressure of $10^{-4}$ Torr, the materials are heated to 1150° C. for 30 minutes, and then cooled to room temperature. The resulting composite is fully dense. It is designated as Example 1. The strength of the composite is 700 MPa. Young's modulus is 185 GPa and toughness is about 17 MPa m$^{1/2}$.

Micrographs of composite Example 1 are taken at various magnifications. FIG. 1 is a micrograph of Example 1 at a magnification of 250×. Composite Example 1 is seen to have a surface copper layer 2, and veins of copper 3 permeate regions of the sample. Copper veins 3 are on the order of 1-20 microns wide and extend several hundred microns into the composite structure. Box 4 indicates a region that is further enlarged to form FIG. 2.

Figure 2:
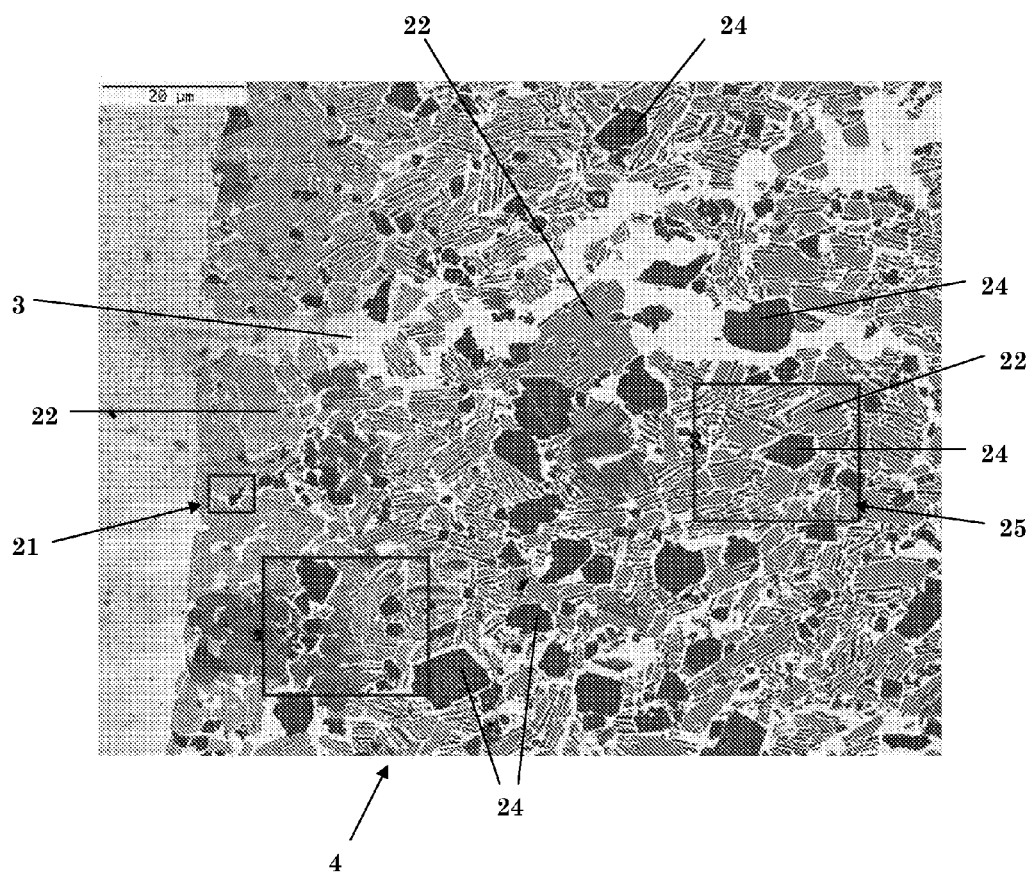
FIG. 2 is a micrograph of a composite of the invention, depicting the region identified in FIG. 1 by reference numeral 4 at a magnification of 1000×.

In FIG. 2, more of the microstructure of Example 1 is illustrated, at a magnification of 1000×. Copper vein 3 extends through composite section 4. Darker microstructures such as those indicated by reference numbers 24 are titanium-carbon domains having the approximate composition $TiC_{0.66-1.0}$. Domains that appear as a lighter shade of gray, such as those indicated by reference numerals 22, have the approximate composition $Ti_4SiCuC_{3-4}$. The composition of domains 22 indicates that the copper has reacted with the $Ti_5Si_2C_4$ domains that were present in the starting material.

Figure 3:
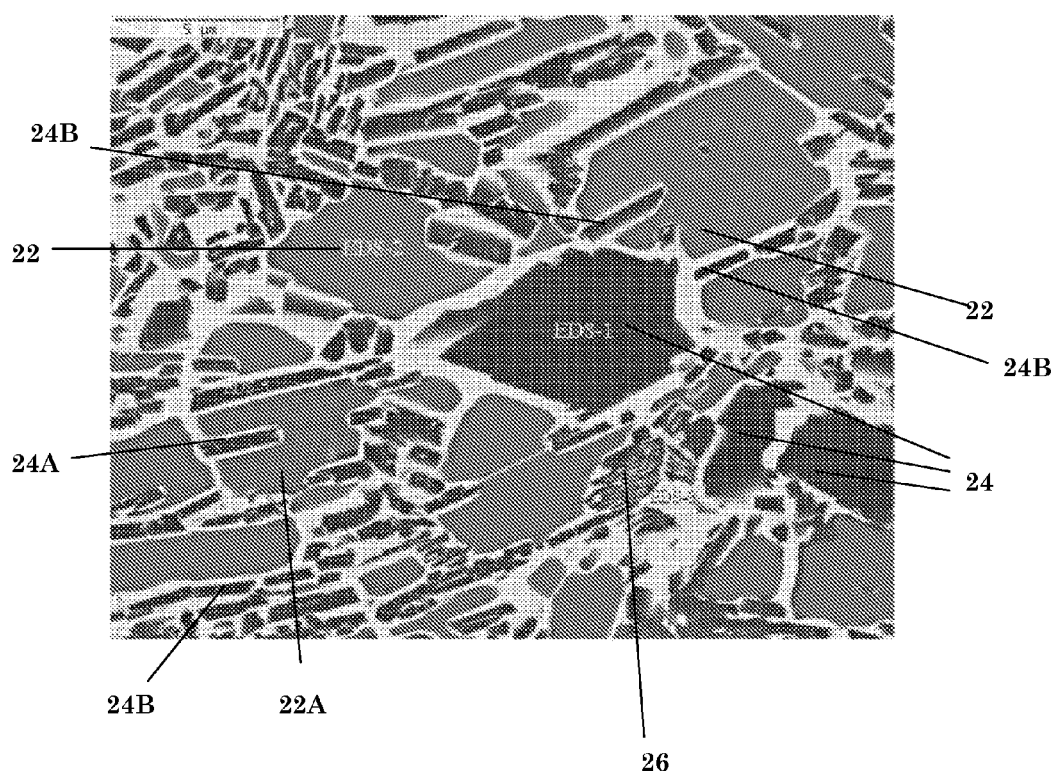
FIG. 3 is a micrograph of a composite of the invention, depicting the region identified in FIG. 2 by reference numeral 25 at a magnification of 5000×.

The lightest-colored regions in FIG. 2 correspond to copper domains. As can be seen, copper surrounds essentially all ceramic grains and separates the individual grains from adjacent grains. Box 25 identifies a region of the composite that is shown in FIG. 3 at a magnification of 5000×. In FIG. 3, this infiltration of copper around each ceramic particle is clearly shown. In FIG. 3, titanium-carbon domains appear as the darkest regions. Some of these are indicated by reference numerals 24. Some of the titanium-carbon domains are residual impurities that were present in the starting TSC material. Domains having the approximate composition $Ti_4SiCuC_{3-4}$ again appear as a lighter shade of gray, such as those indicated by reference numerals 22. The light-colored copper domains are seen to separate each ceramic domain from its neighbors.

Some titanium-carbon domains appear in FIG. 3 as elongated plate-like structures, such as those indicated by reference numerals 24A and 24B. Some of these elongated titanium-carbon domains are seen to extend into or through $Ti_4SiCuC_{3-4}$ domains, as is the case with titanium-carbon domains 24A, which extend into or through $Ti_4SiCuC_{3-4}$ domain 22A. This phenomenon is believed to be due to the penetration of copper metal into the layered structure of the $Ti_5Si_2C_4$ starting material, where it reacts to form $Ti_4SiCuC_{3-4}$ and a titanium-carbon phase, which then form separate microdomains such as those indicated by reference numerals 22A and 24A. Reference number 26 indicates a region in which a more complete penetration into the layers of a $Ti_5Si_2C_4$ region may have occurred.

FIG. 4 is an enlargement of the area indicated by box 21 of FIG. 2, which is shown at a magnification of 20,000×. Dark region 41 has the approximate composition $TiC_{0.66-1}$, as before. Copper domains, such as those indicated by reference numbers 42, are light-colored and separate ceramic grains from adjacent grains. Striated areas 43 are regions in which copper has greatly penetrated between the layers of the $Ti_5Si_2C_4$ starting material to exfoliate the material and form nano-scale domains. The region of the composite depicted in FIG. 4 is closer to the metal layer than is the region depicted in FIG. 3. This may account for what appears to be a more complete infiltration into the domains of $Ti_5Si_2C_4$ starting material in FIG. 4, as the region in FIG. 4 will have been exposed to the metal for a longer time than regions such as that depicted in FIG. 3, which are farther away from the metal source.

By repeating Example 1 using different amounts of copper and varying the time at the processing temperature, various gradient structures are produced. These range from structures in which copper penetrates throughout the entire sample, to those in which one side of the structure is 100% copper and the opposing side contains no copper.

EXAMPLE 2

A 12 mm×12 mm×6 mm sample of a $Ti_2AlC$ material that has been previously densified by hot pressing is placed in a vacuum furnace. Aluminum foil (~10 g) is laid on top of the TAC material. The furnace is evacuated to a pressure of $10^{-4}$ Torr, the materials are heated to 1150° C. for 30 minutes, and then cooled to room temperature. The resulting composite is fully dense, with aluminum having penetrated between the grain boundaries and around individual ceramic grains. By varying the amount of metal and the time at the processing temperatures, the extent of metal penetration is varied, and gradient structures are produced. These structures range from those in which aluminum penetrates throughout the entire structure, to those in which one side of the structure is 100% aluminum and the opposing side contains no aluminum phase.

EXAMPLE 3

$Ti_3SiC_2$ powder is pressed into a 12 mm diameter×6 mm puck to a green density of 58% and placed in a graphite Astro furnace. 10 g of a copper foil (Alloy 110) is positioned on top of the puck, and the sample is heated to 1300° C. for 120 minutes under flowing argon with 5% of hydrogen. After cooling, the sample is fully dense and contains about 40% copper. Microscopic analysis indicates that the $Ti_3SiC_2$ phase has reacted with the copper and is exfoliated into alternating individual plates having the approximate composition $Ti_4SiCuC_{3-4}$ and $TiC_{0.66-1}$, respectively. The plates are on the order of 100 nanometers thick with a length in the range of 0.5 to 1 micron. Some of the plates have reacted further to form even smaller microplates, similar to those shown in FIG. 4. However, the densified sample has a highly uniform composition on a macroscopic level. The strength of this material is 810 MPa, hardness is 280 kg/mm$^2$, Young's modulus is 210 GPa and toughness is 17-20 MPa/m$^2$.

EXAMPLE 4

A mixture of 90% by weight $Ti_3SiC_2$ powder and 10% copper powder is pressed into a 50 mm×12 mm×8 mm bar. 50 grams of a copper foil (alloy 110) is placed on top of the pellet, and the assembly is heated in a vacuum oven at $10^{-4}$ torr and 1100° C. for 10 minutes. The sample is then cooled to room temperature. The resulting composite is densified. SEM micrographs show that the composite is macroscopically homogeneous, but at a micron scale, titanium-silicon-carbide domains are seen to be almost entirely surrounded by domains of copper metal. This indicates that the copper has penetrated grain boundaries throughout the composite. The mechanical properties of this material are comparable to those of Example 3.

When this experiment is repeated using 100% by weight $Ti_3SiC_2$ powder instead of the 90/10 powder/copper mixture, infiltration and densification do not take place and the resulting sample is highly porous. This experiment, together with Examples 3 and 4, illustrate the dependence on processing temperature on the composition of the starting body, when a non-densified TSC material is used as the starting body. When no metal powder is mixed into the starting powder, densification occurs only at a temperature well above the melting temperature of the copper metal (as in Example 3). However, densification can occur at a temperature nearing the melting temperature of the copper metal if some copper powder is mixed into the TSC starting body, as in Example 4.

EXAMPLE 5

$Ti_2AlC$ powder is pressed into a pellet 12 mm in diameter and 6 mm thick, and placed in a vacuum furnace. An aluminum-bronze foil (10 g) is positioned on top of the pellet, and the sample is heated to 1300° C. for 5 minutes under an argon/hydrogen atmosphere at ambient pressure. After cooling, the sample is fully dense and contains about 30-40% by weight of the metal. Microscopic analysis indicates that the metal has penetrated throughout the structure and infiltrated between individual grain boundaries.

What is claimed is:

1. A method for forming a composite of a metal and a titanium-silicon-carbide starting ceramic material, comprising forming a non-densified starting body including the titanium-silicon-carbide starting ceramic material and contacting the starting body with the metal at a temperature above the melting temperature of the metal but below the degradation temperature of the ceramic material, and at a substmospheric pressure, atmospheric pressure or a superatmospheric pressure of up to 2 atmospheres, for a sufficient time such that at least a portion of the metal infiltrates into the starting body to form a densified composite, and then cooling the resulting composite to below the melting temperature of the metal, wherein the metal is copper or a copper alloy that contains at least 75 weight percent copper and the temperature is 1250° C. to 1500° C.

2. The method of claim 1 wherein the temperature is from 1300° C. to 1400° C.

3. The method of claim 1, wherein at least a portion of the metal permeates into grains of the starting ceramic material.

4. The method of claim 3, wherein a portion of the starting ceramic material is exfoliated to form a layered structure having alternating plate-like phases, in which each of the alternating plate-like phases has a thickness of from 3 to 100 nanometers.

5. The method of claim 4, wherein the starting ceramic material includes a titanium-silicon-carbide phase in which the atomic ratio of titanium to silicon is from 2.3:1 to 3.3:1 and the atomic ratio of carbon to silicon is from 1.8:1 to 2.3:1, the metal is a copper wrought or cast alloy containing at least 99% by weight copper, a high copper alloy containing at least 97% by weight copper, or an aluminum bronze containing up to about 15% by weight aluminum, up to 6% by weight nickel, up to 5% by weight iron and at least 80% by weight copper, and a portion of the metal reacts with the titanium-silicon-carbide phase to form exfoliated plates of a titanium-silicon-copper-carbon phase.

6. The method of claim 1 in which the composite contains from 1 to 50% by weight of the metal.

7. The method of claim 6, wherein the composite is a body that has a gradient structure wherein the concentration of metal changes on a macroscopic scale along one or more dimensions of the composite body, such that certain regions of the composite body have a higher metal content, on a macroscopic scale, than do other regions of the composite body.

8. The method of claim 7, wherein one or more regions of the composite body contain essentially 100% metal, and the metal concentration in the composite body decreases with increasing distance from the metal region or regions.

9. The method of claim 1, wherein the metal constitutes from about 10 to 90% of the volume of the composite.

10. The method of claim 1, wherein the starting body contains up to 50 volume percent of SiC, $B_4C$, WC, $Al_2O_3$, MgO, $ZrO_2$, AlN, $SiB_4$, $SiB_6$ or a mixture of two or more thereof.

11. A method for forming a composite of a metal and a titanium-silicon-carbide or titanium-aluminum-carbide starting ceramic material, comprising forming a densified starting body including the titanium-silicon-carbide or titanium-aluminum-carbide starting ceramic material and contacting an external surface of the starting body with the metal at a subatmospheric pressure, atmospheric pressure or a superatmospheric pressure of up to 2 atmospheres and a temperature above the melting temperature of the metal but below the temperature at which the ceramic material decomposes, coarsens or oxidizes, for a sufficient time such that at least a portion of the metal infiltrates into the starting body, permeates between grains of the starting ceramic material such that a portion of the starting ceramic material becomes exfoliated to form a layered structure having alternating plate-like phases in which each of the alternating plate-like phases has a thickness of from 3 to 100 nanometers and forms a composite, and then cooling the resulting composite to below the melting temperature of the metal.

12. The method of claim 11, wherein the metal infiltrates throughout the starting body.

* * * * *